(12) United States Patent
Hamilton et al.

(10) Patent No.: US 9,449,028 B2
(45) Date of Patent: Sep. 20, 2016

(54) DYNAMIC DEFINITIVE IMAGE SERVICE

(75) Inventors: Justin Hamilton, Bellevue, WA (US); Troy Ma, Bellevue, WA (US); Kun Wu, Redmond, WA (US); Bing Lang, Beijing (CN); Xiaowei Sheng, Beijing (CN); Avinash Vemuluru, Redmond, WA (US); Paul Borza, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 13/340,721

(22) Filed: Dec. 30, 2011

(65) Prior Publication Data

US 2013/0173603 A1 Jul. 4, 2013

(51) Int. Cl.
G06F 17/30 (2006.01)

(52) U.S. Cl.
CPC ... *G06F 17/30268* (2013.01); *G06F 17/30265* (2013.01); *G06F 17/30286* (2013.01)

(58) Field of Classification Search
CPC .................. G06F 17/30277; G06F 17/30268; G06F 17/30265; G06F 17/30247; G06F 17/30864; G06F 17/30286; G06F 19/28
USPC .................................................. 707/723, 749
See application file for complete search history.

(56) References Cited

U.S. PATENT DOCUMENTS

| | | | |
|---|---|---|---|
| 6,182,069 B1 * | 1/2001 | Niblack et al. | |
| 6,522,780 B1 | 2/2003 | Pass et al. | |
| 7,689,544 B2 | 3/2010 | Koenig | |
| 7,962,468 B2 * | 6/2011 | Sanyal et al. | 707/706 |
| 2006/0020597 A1 * | 1/2006 | Keating | G06F 17/3025 |
| 2008/0198409 A1 * | 8/2008 | Bodin et al. | 358/1.15 |
| 2011/0078159 A1 * | 3/2011 | Li | G06F 17/3028 707/749 |
| 2011/0085697 A1 * | 4/2011 | Clippard et al. | 382/100 |
| 2011/0106656 A1 | 5/2011 | Schieffelin | |
| 2011/0106782 A1 | 5/2011 | Ke et al. | |
| 2013/0142418 A1 * | 6/2013 | van Zwol et al. | 382/159 |
| 2013/0170738 A1 * | 7/2013 | Capuozzo | G06F 17/30265 382/159 |

OTHER PUBLICATIONS

Sznajder, et al., "Metric Inverted—An Efficient Inverted Indexing Method for Metric Spaces", Retrieved at <<http://domino.research.ibm.com/comm/research_people.nsf/pages/mamou.pubs.html/$FILE/article_ECIR.PDF>>, Proceedings of the 30th European Conference on Information Retrieval (ECIR), Mar. 30-Apr. 3, 2008, pp. 9.

(Continued)

*Primary Examiner* — Tony Mahmoudi
*Assistant Examiner* — Merilyn Nguyen
(74) *Attorney, Agent, or Firm* — Dave Ream; Tom Wong; Micky Minhas

(57) ABSTRACT

Systems and methods for identifying a representative image for any given search query are provided. In response to a search for a query term (or terms), the system accesses an inverted index to identify images associated with that term. The system then receives a ranked list of images. The ranked list includes image identifiers, and once an item in the list is selected the system can use the associated image identifier to retrieve the image from a server. If an editor has overridden the default image for the present search query, then the system returns the image identifier for the overridden image, which can be used to access the image from the server. Thus, the representative image system provides a reliable and universal mechanism for retrieving representative images for any given topic dynamically in real time.

20 Claims, 5 Drawing Sheets

(56) References Cited

OTHER PUBLICATIONS

Mueller, et al., "Efficient Access Methods for Content-Based Image Retrieval with Inverted Files", Retrieved at <<http://www.csse.monash.edu.au/~davids/publications/postscript/1999/MuellerHSquireMuellerWPun_msasIV.ps.gz>>, Multimedia Storage and Archiving Systems IV, vol. 3846 of SPIE, Sep. 20-22, 1999, pp. 461-472.

Zheng, et al., "Effective and Efficient Object-Based Image Retrieval using Visual Phrases", Retrieved at <<http://www.jdl.ac.cn/doc/2006/Effective%20and%20Efficient%20Object-based%20Image%20Retrieval%20Using%20Visual%20Phrases.pdf>>, Proceedings of the 14th annual ACM international conference on Multimedia, Oct. 23-27, 2006, pp. 77-80.

Sayad, et al., "Effective Object-Based Image Retrieval using Higher-Level Visual Representation", Retrieved at <<http://ieeexplore.ieee.org/stamp/stamp.jsp?tp=&arnumber=5648110>>, International conference on Machine and Web Intelligence (ICMWI), Oct. 3-5, 2010, pp. 218-224.

\* cited by examiner

DYNAMIC DEFINITIVE IMAGE SERVICE

BACKGROUND

The Internet provides access to a vast amount of information. A major challenge given the quantity of information is how to find and discover information to provide a user with the most relevant information for a particular circumstance. The most common tool for doing this today is a keyword based search query provided to a search engine. The search engine matches received keywords to one or more words or phrases in a search index to identify documents, web pages, or other content that is potentially relevant to the user's query. For example, if a user searches for "dinosaurs" then the search engine provides the user a list of search results that are links to web pages that contain that term.

User queries often contain one or more entities (e.g., a person, location, or organization name) identified by name or properties associated with the entity. For example, one query might search for "Barack Obama", while another might search for "President of the United States". Both of these queries are looking for information related to a specific entity. Users may also search for locations, such as restaurants, banks, shopping centers, and so forth. Entities may include any type of nameable thing whether it is a business, person, consumer good, service, and so forth.

Today, when users search for a named entity using a search engine, the search engine presents assorted results that may be about a mixture of different entities with the same or similar names. It is often useful to visually represent a given entity with an image associated with that entity. For example, if the user searches for "beagle dog", it might be useful to display a picture of a beagle next to a group of or individual search results. This can give the user a quick visual clue as to whether the search results are related to the same entity that the user intended. However, there is no well-defined way today to access an image for any particular topic or entity. Search engines often provide an image search, but it is unclear what images will be returned from such a search and whether any particular image is appropriate as a representative image for a particular entity. There is currently no mechanism that returns a representative image in real time given a search query.

SUMMARY

A representative image system is described herein that provides a representative image for any given search query. In some embodiments, the system uses an inverted index with a custom neural net ranker to return a definitive image identifier for each query. In addition, the system maintains a hash table allowing the definitive image identifier to be overridden editorially. The definitive image identifier is used to reference and return a raw image binary from a thumbnail server. Upon receiving a search for a term (or terms), the system accesses the inverted index to identify images associated with that term. The system then receives a ranked list of images, and can select the top ranked or other image. The ranked list includes image identifiers, and once an item in the list is selected, the system can use the associated image identifier to retrieve the image from a thumbnail or other server. In some cases, the system may retrieve multiple images (e.g., to display a collage of images for a topic) for display. If an editor has overridden the default image for the present search query, then the system returns the image identifier for the overridden image, which can be used to access the image from the thumbnail or other server. Thus, the representative image system provides a reliable and universal mechanism for retrieving representative images for any given topic dynamically in real time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
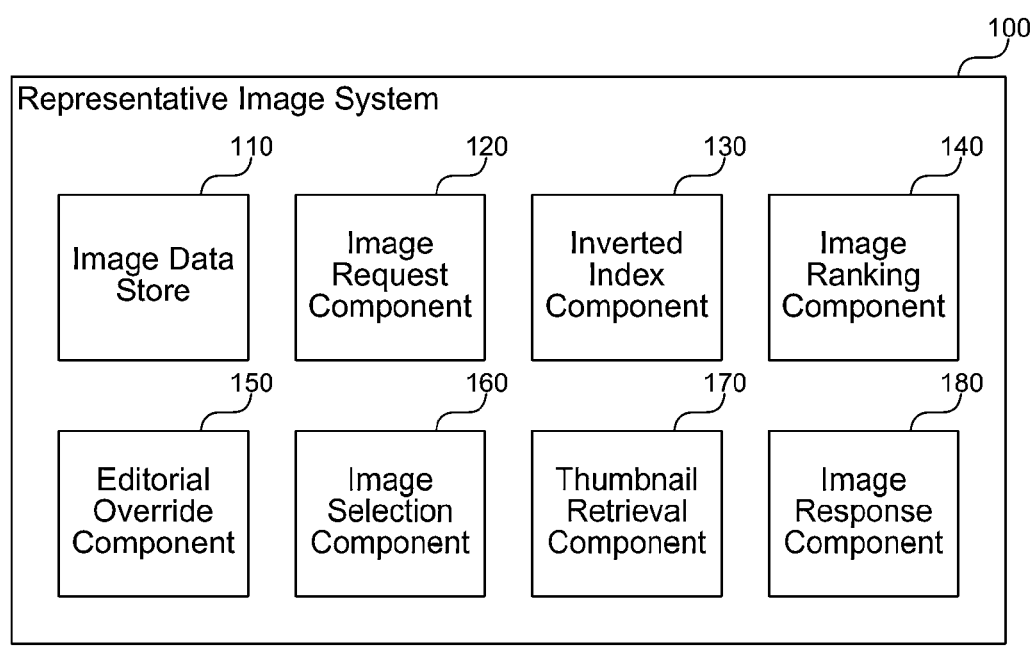
FIG. 1 is a block diagram that illustrates components of the representative image system, in one embodiment.

A representative image system is described herein that provides a representative image for any given search query. In some embodiments, the system uses an inverted index with a rank score computed for each image to return a definitive image identifier for each query. The rank score can be computed using a variety of methods (e.g., a custom neural net ranker, a weighted function, and so on). In addition, the system maintains a data structure (e.g., a hash table, binary tree, or other structure) allowing the definitive image identifier to be overridden editorially. The definitive image identifier is used to reference and return a raw image binary from a thumbnail server. For example, if a user searches for the term "Hillary Clinton", the system accesses the inverted index to identify images associated with that term. The system then receives a ranked list of images, and can select the top ranked or other image. The ranked list includes image identifiers, and once an item in the list is selected, the system can use the associated image identifier to retrieve the image from a thumbnail or other server. In some cases, the system may retrieve multiple images (e.g., to display a collage of images for a topic) for display. In some embodiments, the system also accesses a hash table through which editors can override one or more images that would otherwise be provided. If an editor has overridden the default image for the present search query, then the system returns the image identifier for the overridden image, which can be used to access the image from the thumbnail or other server. Thus, the representative image system provides a reliable and universal mechanism for retrieving representative images for any given topic dynamically in real time.

The representative image system provides a mechanism where given a query it returns a representative image in real time. For a search engine that already provides image search results, the system can leverage an existing inverted index used to display image search results, but applies a custom neural net ranker to return a definitive image identifier for each query. In some embodiments, the custom ranker biases towards high-quality images used frequently on authoritative websites. The definitive image identifier is then used to fetch the raw image binary from the thumbnail server. In some embodiments, definitive images are cached publically to reduce load on search servers for subsequent requests.

For head queries, editors can manually override definitive image identifiers to specify a different image for certain queries. In some embodiments, these definitive overrides are stored in a distributed hash table allowing editorial selection of images. For example, editors may be shown the top 20 images returned by the custom ranker and can then click to select their choice for a representative image.

The system operates in two major phases: 1) offline training and editorial definitive image selection, and 2) on demand display of definitive images, each of which is described in further detail herein. During offline training and editorial selection, the system performs the following high-level processes. First, for tail queries, the definitive image ranker is trained to prefer large, high-quality images used frequently on authoritative websites. For head queries, editors can manually select definitive images using an editorial tool. The top images from the definitive ranker are displayed allowing editors to select an appropriate representative image. Editorially judged definitive images are submitted to an image crawler on a whitelist to ensure that they are re-crawled and do not expire from the index.

During the phase of on-demand display of definitive images, the system performs the following high-level processes. The system receives a request to a definitive image entry point with a query for a definitive image. If an editorially judged hero image is available for that query then the corresponding image identifier is selected. Otherwise, the definitive image ranker is used to select a definitive image identifier from the inverted index. The system sends a request to the thumbnail server with the selected image identifier requesting the corresponding image binary. The definitive image binary is returned in response to the definitive image request.

FIG. 1 is a block diagram that illustrates components of the representative image system, in one embodiment. The system 100 includes an image data store 110, an image request component 120, an inverted index component 130, an image ranking component 140, an editorial override component 150, an image selection component 160, a thumbnail retrieval component 170, and an image response component 180. Each of these components is described in further detail herein.

The image data store 110 stores one or more images or references to images stored in other data stores. The image data store 110 provides images in response to requests that include a specific image identifier. The store 110 may include a variety of image types, including varying resolutions of the same image so that thumbnails, low bandwidth images (e.g., for mobile devices), and high-resolution image binaries are available for any given image. The image data store 110 may include one or more files, file systems, hard drives, databases, storage area networks, distributed storage services, cloud-based storage services, or other facilities for storing image data. The store 110 may also include additional metadata, such as an image identifier associated with each image, image format information, historical request data, and so on.

The image request component 120 receives a request during a query for a definitive image that is representative of a topic of the query. The image request may include the query string and other information (e.g., a requesting client's identification) that may help to find an appropriate image. In response to the request, the image request component 120 invokes other components of the system 100, such as the inverted index component 130 to find one or more images potentially matching the request, the image ranking component 140 to rank potentially matching images based on relevance and quality, the editorial override component 150 to identify any additional images provided by editors, the image selection component 160 to select one among the potentially matching images as a definitive image, and the thumbnail retrieval component 170 to access the selected image from the image data store 110. The image request component 120 may respond to a variety of common or proprietary network protocols, including Hypertext Transfer Protocol (HTTP), web services protocols, and so forth. The image request component 120 may operate on top of an existing search engine to service requests for definitive images in addition to requests for image or other types of searches already handled by the search engine.

The inverted index component 130 maintains an inverted index that maps one or more query terms to one or more images that are related to those terms. The system 100 may periodically crawl the Internet, a local area network (LAN), or other resources to identify accessible images that may be responsive to particular queries. During the crawl, the system 100 can identify metadata near the image, such as text, anchor text, keywords, alt image text, and other information that may provide context information related to the image. The index then provides a fast data structure for looking up previously identified images by keyword or other information. The inverted index component 130 may distribute the index in a variety of ways known in the art to accommodate large server loads from many contemporaneous client requests. The inverted index may be shared between a search engine service for finding multiple images in response to a search query and a search engine service for finding a single definitive image related to a search query or other purpose.

The image ranking component 140 ranks one or more images identified in the index that potentially match the query terms to sort identified images by a relative likelihood of being a definitive image for the topic of the query. The component 140 may use a neural net ranker that factors in information such as authoritativeness of a source of the image, resolution and quality of the image, level of match between image classification and the topic of the query, and so forth. The ranker's task is to identify which of the images among all of the potential images is most likely to be a definitive image for the topic of the query. The ranker operates on top of the inverted index for finding images relevant to a topic to provide a relative level of merit between found images. In the case where an editor has overridden default logic of the system 100 to select a particular definitive image for a topic manually, the system 100 may store the editor's action as a high rank of the image for a topic, such that the ranker chooses the editor's image absent any factors that cause other images to have a higher rank.

The editorial override component 150 provides an interface through which a human editor can manually override the definitive image selected by other components of the system to identify an editor-chosen definitive image. The component 150 also provides an interface accessed by the system 100 during queries to determine whether such an editor-chosen image exists for the topic of the query and to provide an identifier for the editor-chosen image if one exists. The editorial override component 150 helps to alleviate situations where a particular image may be trending high in rankings due to current events or other factors. For example, a parody of a presidential candidate may trend higher than a normal image of the candidate, and the system 100 may prefer to select as a definitive image one that is not subject to popular swings. In addition, for some topics the ranker may simply not choose the most representative image and an editor can provide input in such cases to ensure that a good definitive image is selected for a topic. The editorial override component 150 may provide a user interface, such as a web page or mobile application, through which selected editors can select definitive images for particular topics. In some cases, the user interface may display the top N images selected by the system 100 for the topic and allow the editor to choose one. The system 100 may also use crowd sourcing or other techniques to allow a large number of editors to influence the definitive image choice by cumulative weight of voting for an image.

The image selection component 160 selects a definitive image based on images returned from the index, any overridden editor-chosen definitive image, and ranking input from the image ranking component. The output of the image selection component 160 is a single definitive image (or group of images ordered by definitive rank, such as in the case of a definitive collage that will be shown) that represents the topic of the query received in the image request. The output of the component is generally in the form of an image identifier, which may be a number, globally unique identifier (GUID), Uniform Resource Identifier (URI), or other form of reference to the selected definitive image.

The thumbnail retrieval component 170 retrieves the selected definitive image binary based on a definitive image identifier provided by the image selection component. The thumbnail retrieval component 170 accesses the image data store 110 and provides the definitive image identifier, along with any information related to format of the image (e.g., desired resolution, resolution of the requesting device, dimensions of the area where the image will be displayed, and so forth). In response, the image data store 110 returns an image binary that is a displayable form of the image. The format of the image may vary by implementation and may include any common format, such as GIF, JPG, PNG, or others. In some cases, images may have particular usage requirements, such as copyrights, pay-per-use, or other restrictions that the thumbnail retrieval component 170 manages.

The image response component 180 responds to the received image request with the retrieved definitive image binary. The response is in a form suitable for the request. For example, if the request was an HTTP GET request, then the response is an HTTP 200 OK response with the image data. The response format may vary depending on a particular implementation of the system and the protocols supported by that implementation. The image response component 180 may also provide additional information, such as other images available for the query, a level of match of the definitive image to the query, other resolutions of the image available, and so forth. In some cases, the definitive image is provided along with other image results in a standard image search, but the response identifies the definitive image by a flag, by its order as the first image in the results, or through another mechanism accessible by the client making the request.

The computing device on which the representative image system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
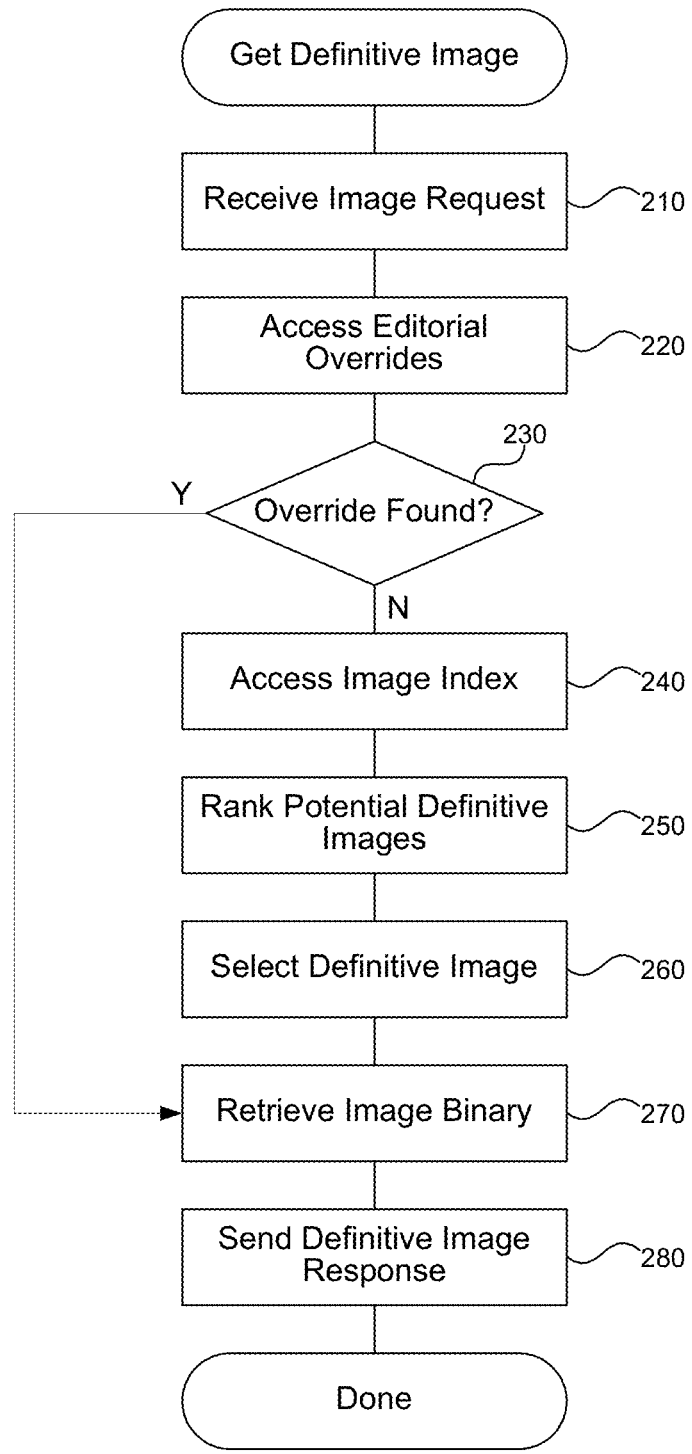
FIG. 2 is a flow diagram that illustrates processing of the representative image system to access an image that is representative of a query topic, in one embodiment.

FIG. 2 is a flow diagram that illustrates processing of the representative image system to access an image that is representative of a query topic, in one embodiment.

Beginning in block 210, the system receives a request for a definitive image related to an identified query. The request may include the query string, along with any additional information such as dimensions or quality level of the requested image. In some cases, devices may identify a particular image size to reduce bandwidth where quality above a certain level will not be detectable in the displayed image (e.g., on a lower resolution device or where the image is limited to a small area of the total display). The system may provide one or more entry points through which the request is received, such as a web-based service or an internal programmatic interface that a search engine can leverage to provide definitive images with search results.

Continuing in block 220, the system accesses a store of editorial overrides to determine whether an editor has manually selected a definitive image related to the identified query. The system may provide a hash table or other data structure for efficiently looking up editorial overrides for definitive images. Editors may go through popular query topics and manually select definitive images in cases where the system-selected definitive image is not the most relevant in the editor's opinion. The system stores such overrides for use during query requests so that the editor's choice is provided in lieu of the system's default choice.

Continuing in decision block 230, if the system finds an editorial override, then the system selects an identifier of the override as the definitive image for responding to the request and jumps to block 270, else the system continues at block 240.

Continuing in block 240, the system accesses an index of images that maps query subjects to images related to those subjects. The system may leverage an existing inverted index used for responding to general image search requests that identify multiple matching images for a particular query. The system accesses the index to build a candidate set of potential definitive images for responding to the received definitive image request. The system may return a list of image identifiers from the index as potential definitive images.

Continuing in block 250, the system ranks the potential definitive images identified in the index to sort the potential definitive images by a relative level of likelihood of being a definitive image. The ranking may consider information such as the image's resolution (where higher resolution images may be preferable to lower resolution images), whether the source of the image is an authoritative source, whether contextual information related to the image matches information in the query, and so on. The system may apply neural net ranking to determine a most relevant match among the potential definitive images.

Continuing in block 260, the system selects as the definitive image the highest-ranking potential definitive image. The selection identifies an image identifier that corresponds to the selected definitive image. The system may provide an image cataloging set of identifiers that uniquely identifies each image in an image data store, such that requests for images need only provide the identifier to identify any particular image. This is often more efficient than sending image binaries back and forth during computations such as determining a definitive image. However, other implementation variations are possible and the use of an image identifier as used herein can include any reference to an image or the image binary data itself.

Continuing in block 270, the system retrieves an image binary from an image data store that is associated with the selected definitive image. In some embodiments, the system submits a request to the image data store with the image identifier of the selected image and the image data store responds with the image binary data. The request may also include additional information, such as a requested quality level, resolution, or size of the requested image, so that the image data store can return the most appropriate stored version of the image.

Continuing in block 280, the system sends a response that contains the retrieved image binary associated with the selected definitive image in response to the received definitive image request. The response generally mirrors a format of the request, such that the client making the request receives the response in whatever format the client selected for the request. For example, if the client makes an HTTP request, then the system provides the definitive image data as an HTTP response. The image response may also include other information, such as other non-definitive images that are responsive to a general image search request for the query topic. In this way, the system can more efficiently provide two types of data that the client might request in a single interaction with the system. After block 280, these steps conclude.

Figure 3:
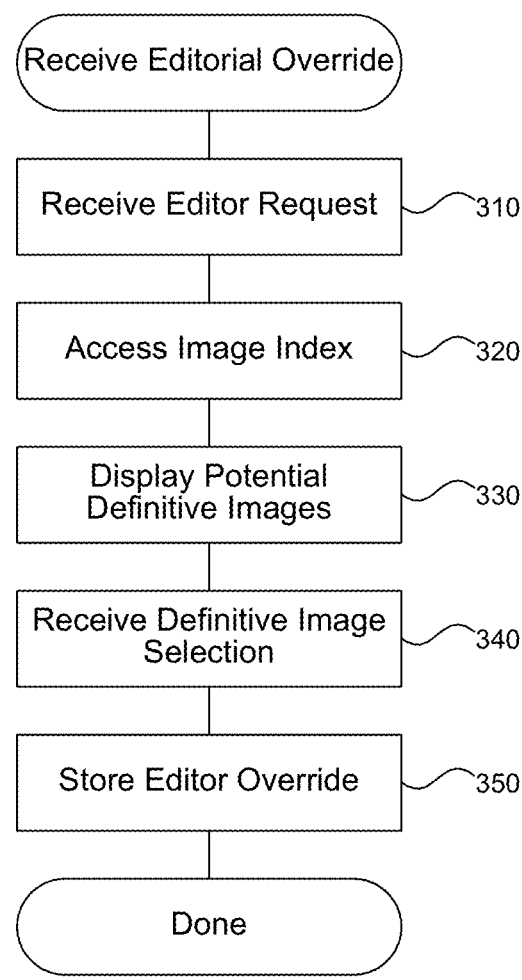
FIG. 3 is a flow diagram that illustrates processing of the representative image system to override a definitive image for a query topic, in one embodiment.

FIG. 3 is a flow diagram that illustrates processing of the representative image system to override a definitive image for a query topic, in one embodiment.

Beginning in block 310, the system receives a request from an editor to select a definitive image for a query topic. Editors may access the system through a user interface provided by the system for overriding definitive image selections. The user interface may include a web page, mobile application, desktop application, programmatic interface, or other application or tool. Editors may include people specifically selected for their expertise (e.g., employees of a search company that review images as part of their job), the general public (e.g., through crowd sourcing), or other groups of people.

Continuing in block 320, the system accesses an image index that returns a set of image search results related to the query topic. Many search engines today provide image search tools that can be used to provide image results. Image results may be based on matching text or other information in the query topic with text contextually associated with the image (e.g., anchor text, image alt text, nearby keywords and phrases, and so forth) as well as dynamic analysis performed on the image itself (e.g., facial and object recognition, optical character recognition, and so on). In cases where the representative image system is integrated with an existing search engine, the two may share an image index that provides results for image searches and definitive image requests.

Continuing in block 330, the system displays one or more potential definitive images retrieved from the index to the editor from which the editor can make a selection of a definitive image. For example, the system may display a tiled display of N images returned from the query such that the editor can click on one to select it as the definitive image. The display may include additional information to help the editor's decision, such as a source of the image, the image's resolution, and so forth. In some cases, the editor may find no good image in the results and may request additional results or flag the query as needing further attention to upload or select a definitive image.

Continuing in block 340, the system receives a selection of a definitive image from the editor, wherein the definitive image is one among the displayed potential definitive images. The selection may come in the form of a user interface action, such as clicking on or typing a number associated with the selected image. The system may also wait until the editor clicks a save button or provides another indication that the editor's choice is complete. For touch-based interfaces, the system may allow the editor to touch an image to select it, and may provide gestures, such as dragging the image to a selection area, to indicate the selection.

Continuing in block 350, the system stores the selected definitive image in an editor override data structure that is accessible during definitive image queries to override any default results. The system may store the editor override in a hash table that matches query topics to definitive image identifiers. During a query, the system first checks the hash table and if an override image is provided for the query topic, the system provides the override image as the definitive image in response to the query. The system may also add selected definitive images to a whitelist of an image crawler that ensures that the images are re-crawled periodically and do not expire from the index. After block 350, these steps conclude.

Figure 4:
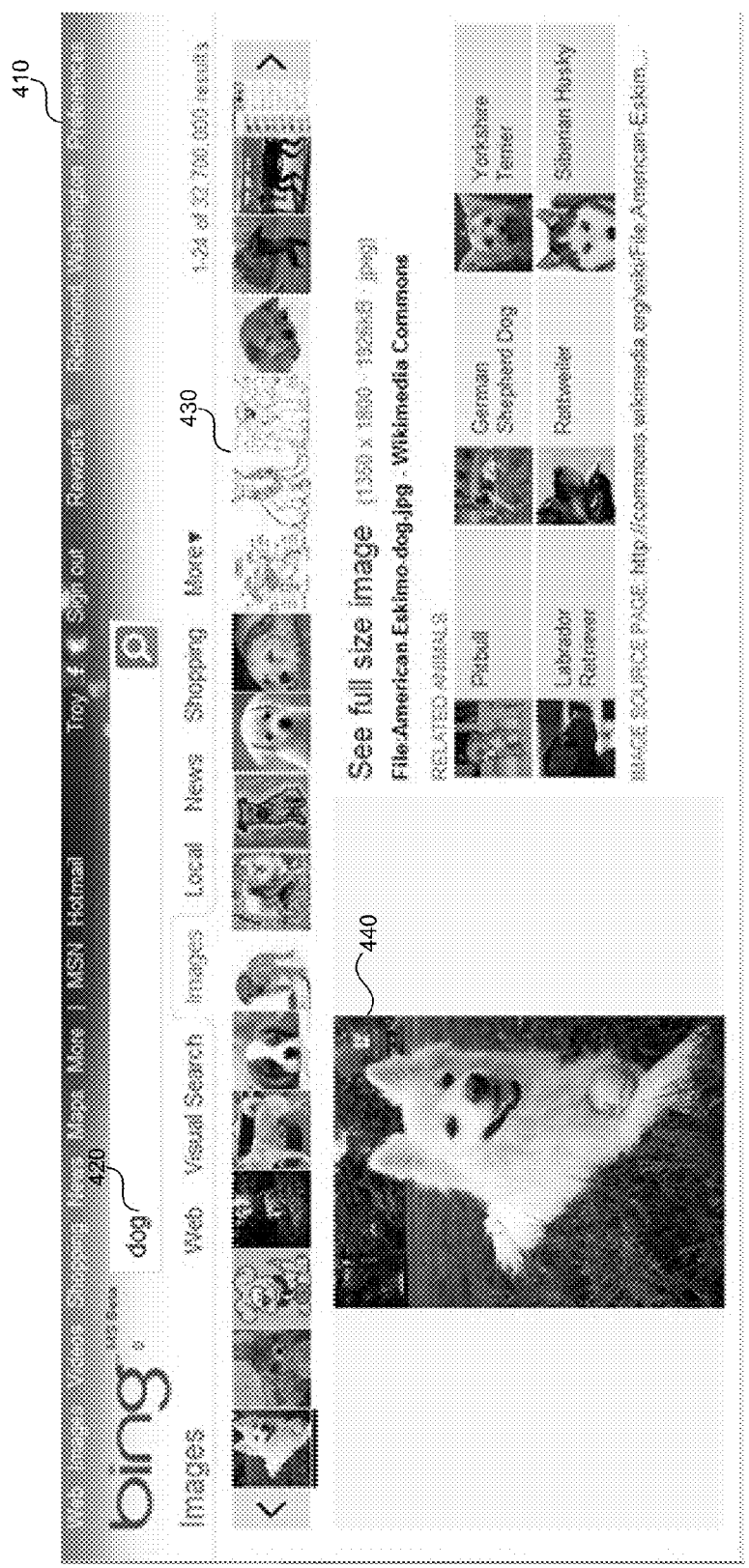
FIG. 4 is a display diagram that illustrates a search user interface for finding images using the representative image system, in one embodiment.

FIG. 4 is a display diagram that illustrates a search user interface for finding images using the representative image system, in one embodiment. The user interface 410 includes a search bar 420 in which a user can enter a textual, keyword-based query. In the illustrated example, the user has entered the query "dog" to find images of dogs. The system returns a list of images displayed in the image strip 430 that includes many pictures of dogs. The search also identifies a definitive image 440 that is representative of the query topic. This illustration shows how image search and selection of a definitive image can be used together in a complimentary service. However, the system may also be used in cases that are not related to visual search (not shown), to pick and display a representative image in other cases where an illustration provides a helpful visual cue for a topic.

Figure 5:
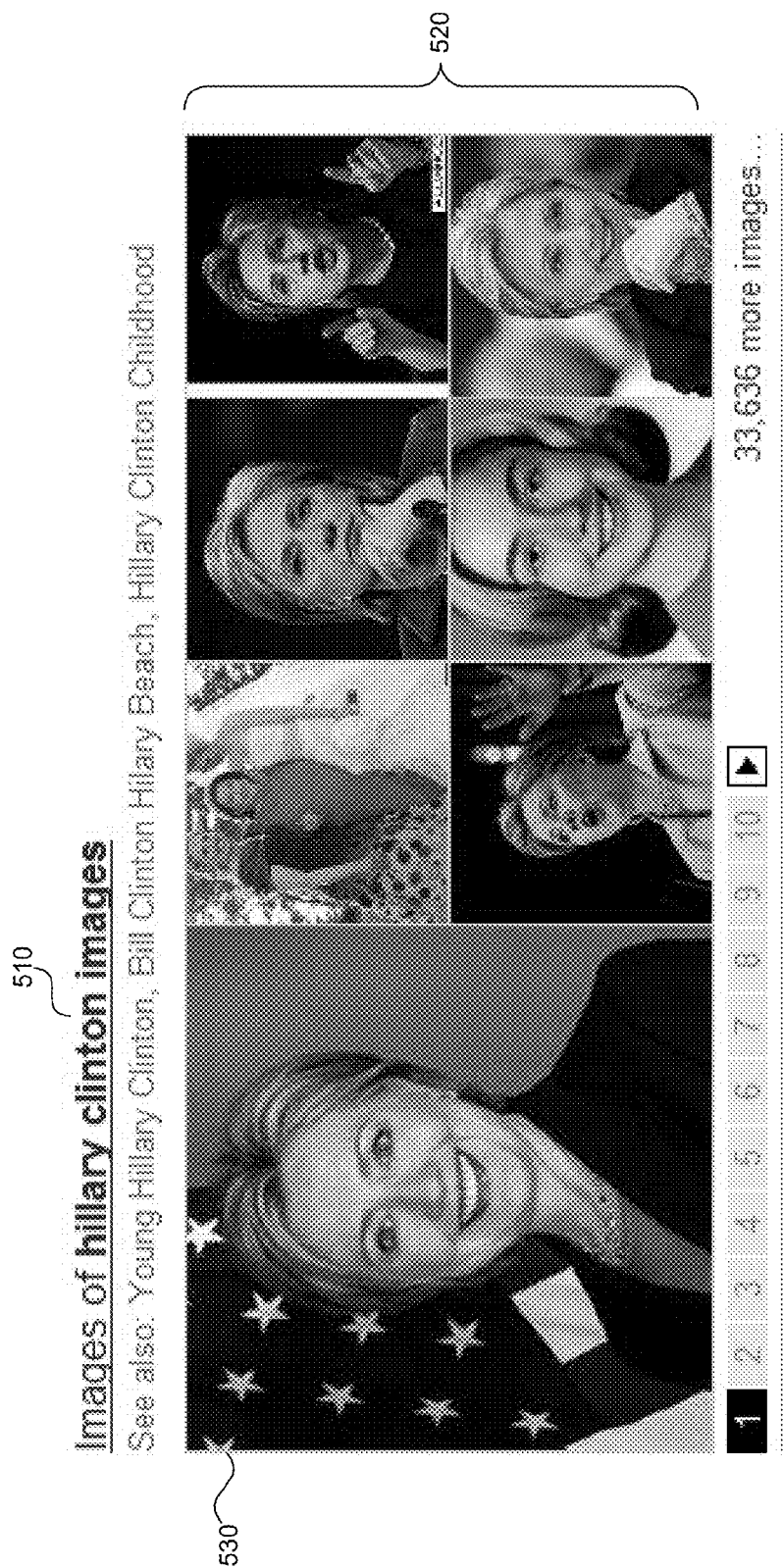
FIG. 5 is a display diagram that illustrates an alternative display of images related to a query, in one embodiment.

FIG. 5 is a display diagram that illustrates an alternative display of images related to a query, in one embodiment. The display includes an identification of the query 510, a collage of images 520, and a definitive image 530. The collage of images 520 includes several images that are responsive to the query text "Hillary Clinton images". The definitive image 530 is one selected from the group that is of particular relevance. For example, the definitive image 530 may come from a particularly reliable or source or may have a higher resolution or better format than other images. The display of FIG. 5 can also be used to show editors available images for overriding the system-selected definitive image. In such a case, the collage of images 520 provides other images that the editor can select as the definitive image, and the currently chosen definitive image 530 appears in a larger box to indicate its status to the editor.

In some embodiments, the representative image system may rank particular images down in the index. Just as images may be ranked up as described herein for appearing on an authoritative site or for having high resolution, the system may also negatively weight the ranking of any image that appears on a known spam site, on parody sites (depending on the purpose of the image), and so forth. In this way, the system can ensure that available cues of lower quality are factored into the decision of finding a definitive image.

From the foregoing, it will be appreciated that specific embodiments of the representative image system have been described herein for purposes of illustration, but that various modifications may be made without deviating from the spirit and scope of the invention. Accordingly, the invention is not limited except as by the appended claims.

We claim:

1. A computer system for providing a dynamic definitive image service, the system comprising:
    a processor and memory configured to execute software instructions embodied within the following components;
    an image data store that stores one or more images or references to images stored in other data stores;
    an image request component that receives a request during a query for a definitive image that is representative of a topic of the query;
    an inverted index component that maintains an inverted index that maps one or more query terms to one or more images that are related to those terms;
    an image ranking component that ranks one or more images identified in the index that potentially match the query terms to sort identified images by a relative likelihood of being a definitive image for the topic of the query;
    an editorial override component that provides an interface through which a human editor can manually override the definitive image selected by other components of the system to identify an editor-chosen definitive image;
    an image selection component that selects a definitive image based on images returned from the index, any overridden editor-chosen definitive image, and ranking input from the image ranking component;
    a thumbnail retrieval component that retrieves an image binary associated with the selected definitive image based on a definitive image identifier provided by the image selection component; and
    an image response component that responds to the received image request with the retrieved image binary.

2. The system of claim 1 wherein the image request component receives the request and invokes the inverted index component to find one or more images potentially matching the request, the image ranking component to rank potentially matching images based on relevance and quality, the editorial override component to identify any additional images provided by editors, the image selection component to select one among the potentially matching images as a definitive image, and the thumbnail retrieval component to access the selected image from the image data store.

3. The system of claim 1 wherein the image request component operates on top of an existing search engine to service requests for definitive images in addition to requests for image or other types of searches already handled by the search engine.

4. The system of claim 1 wherein the inverted index component is updated by crawling a network and identifying metadata near images that provides context information related to the image.

5. The system of claim 1 wherein the inverted index component provides an index shared between a search engine service for finding multiple images in response to a search query and a search engine service for finding a single definitive image related to a search query.

6. The system of claim 1 wherein the image ranking component applies a neural net ranker that factors in information on an authoritativeness of a source of the image and quality of the image to identify which of the images among all of the potential images is most likely to be a definitive image for the topic of the query.

7. The system of claim 1 wherein the image selection component provides as output a single definitive image that represents the topic of the query received in the image request.

8. A computer-implemented method to access a definitive image, the method comprising:
    storing, in an image data store, one or more images or references to images stored in other data stores;
    receiving a request during a query for the definitive image that is representative of a topic of the query;
    maintaining an inverted index of images that maps one or more query terms to one or more images that are related to the one or more query terms;
    ranking one or more images identified in the inverted index that potentially match the query terms to sort the identified one or more images by a relative likelihood of being the definitive image for the topic of the query;
    selecting the definitive image based on one or more images returned from the inverted index, any overridden editor-chosen definitive image, and the ranking, wherein the editor-chosen definitive image is identified by manually overriding a system selected definitive image from a human editor;
    retrieving an image binary associated with the selected definitive image based on an image identifier associated with the selected definitive image; and
    sending the retrieved image binary associated with the selected definitive image in response to the received request;
    wherein the preceding steps are performed by at least one processor.

9. The method of claim 8 wherein receiving the request comprises receiving a query string associated with the topic.

10. The method of claim 8 wherein receiving the request comprises receiving information indicating a requested quality level of the requested definitive image.

11. The method of claim 8 further comprising accessing a hash table of a store of editorial overrides according to the topic for efficiently looking up editorial overrides for definitive images.

12. The method of claim 8 wherein maintaining the inverted index of images comprises leveraging an existing inverted index used for responding to general image search requests that identify multiple matching images for a particular query.

13. The method of claim 8 wherein ranking one or more images identified in the inverted index comprises ranking based on each image's resolution and authority information associated with a source of the image.

14. The method of claim 8 wherein ranking one or more images identified in the inverted index comprises applying neural net ranking to determine a most relevant match among the one or more identified images.

15. The method of claim 8 wherein selecting the definitive image comprises identifying the image identifier that corresponds to the selected definitive image.

16. The method of claim 8 wherein retrieving the image binary comprises submitting a request to the image data store with the image identifier of the selected definitive image and receiving a response from the image data store with the image binary.

17. The method of claim 8 wherein retrieving the image binary comprises providing image quality level information so that the image data store can return a matching stored version of the selected definitive image.

18. The method of claim 8 wherein sending the retrieved image binary comprises sending the retrieved image binary with other non-definitive images that are responsive to a general image search request for the topic.

19. Computer-readable media encoded with computer-readable instructions which, when executed by a processor on a computing system, carry out a method for providing a definitive image, the method comprising:

storing, in an image data store, one or more images or references to images stored in other data stores;

receiving a request during a query for the definitive image that is representative of a topic of the query;

maintaining an inverted index of images that maps one or more query terms to one or more images that are related to the one or more query terms;

ranking one or more images identified in the inverted index that potentially match the query terms to sort the identified one or more images by a relative likelihood of being the definitive image for the topic of the query;

selecting the definitive image based on one or more images returned from the inverted index, any overridden editor-chosen definitive image, and the ranking, wherein the editor-chosen definitive image is identified by manually overriding a system selected definitive image from a human editor;

retrieving an image binary associated with the selected definitive image based on an image identifier associated with the selected definitive image; and sending the retrieved image binary associated with the selected definitive image in response to the received request.

20. The computer-readable media of claim 19, wherein receiving the request comprises receiving a query string associated with the topic.

\* \* \* \* \*